United States Patent [19]

Saitoh et al.

[11] Patent Number: 4,652,913
[45] Date of Patent: Mar. 24, 1987

[54] METHOD AND APPARATUS FOR READING COLOR IMAGES USING A PLURALITY OF COLOR LIGHT SOURCES IN WHICH ONE OF THE LIGHT SOURCES IS TURNED ON CONTINUOUSLY

[75] Inventors: Hiroyuki Saitoh; Masami Kurata, both of Ebina, Japan

[73] Assignee: Fuji Xerox Co., Ltd., Tokyo, Japan

[21] Appl. No.: 598,870

[22] Filed: Apr. 11, 1984

[30] Foreign Application Priority Data

Apr. 11, 1983 [JP] Japan ............................ 58-63369
May 6, 1983 [JP] Japan ............................ 58-79024

[51] Int. Cl.⁴ .................. H04N 1/46; H04N 9/04; G03F 3/08; G01N 21/25
[52] U.S. Cl. ............................ 358/75; 358/41; 358/80; 250/226; 356/402; 356/407; 356/425
[58] Field of Search .............. 358/75, 75 LJ, 78, 80, 358/41; 382/17; 250/226, 578; 355/4, 35, 37, 355/38; 356/402, 404, 405, 406, 407, 425

[56] References Cited

U.S. PATENT DOCUMENTS

| 4,085,421 | 4/1978 | Gilmour ............................ 358/41 |
| 4,318,122 | 3/1982 | White ............................ 358/75 |
| 4,519,703 | 5/1985 | Lehman et al. ............................ 355/37 |

FOREIGN PATENT DOCUMENTS

| 96112 | 7/1979 | Japan . |
| 30214 | 3/1980 | Japan ............................ 358/75 |
| 97772 | 7/1980 | Japan ............................ 358/75 |
| 131873 | 10/1980 | Japan ............................ 358/75 |
| 17263 | 1/1982 | Japan . |
| 150270 | 9/1982 | Japan ............................ 358/75 |
| 57569 | 4/1984 | Japan ............................ 358/75 |

Primary Examiner—James J. Groody
Assistant Examiner—Randall S. Svihla
Attorney, Agent, or Firm—Spensley Horn Jubas & Lubitz

[57] ABSTRACT

In a method and an apparatus for reading a color image wherein the color image is illuminated and scanned by light from a plurality of light sources having different spectral properties to read the color image on the basis of the reflected light therefrom, at least one light source of the light sources is kept turned on during the scanning operation of the color image, thereby eliminating any problems resulting from its after-glow; and at least one light source of the light sources other than that kept turned on is repeatedly turned on and off with a period corresponding to the period of the scanning operation so as to project the light from the single and plural light sources selected from the light sources, at least once respectively, upon the scanned portions of the color image. The color image is read by detecting colors on the scanned portions of the color image on the basis of levels of the light reflected from the color image. A variety of colors may be detected by the present invention including red, blue, black and cyan. In addition, the present invention also teaches the use of color filters to eliminate the potential after-glow effect of color fluorescent lamps.

6 Claims, 13 Drawing Figures

METHOD AND APPARATUS FOR READING COLOR IMAGES USING A PLURALITY OF COLOR LIGHT SOURCES IN WHICH ONE OF THE LIGHT SOURCES IS TURNED ON CONTINUOUSLY

BACKGROUND OF THE INVENTION

1. Field of the Invention

This invention relates to a method of and an apparatus for reading color image on an original, and particularly to a method and apparatus for photoelectrically reading color information on an original by employing a plurality of light sources having different properties from one another.

2. Description of the Prior Art

A method for photoelectrically reading color image, i.e., color information on an original which has recently attracted public attention comprises steps of sequentially lighting a plurality of light sources having different spectral properties synchronized with the scanning of the original to produce a plurality of picture signals with respect to each scanning line of the original, and discriminating colors of the image on the basis of the levels of these picture signals.

Such a method for reading color image will be described hereinbelow by referring to FIGS. 1 through 3. As an example, a method for producing three kinds of color picture signals of "blue", "red" and "black" by employing two fluorescent lamps of blue and red lamps is described.

Referring to FIG. 1, a blue fluorescent lamp 1 and a red fluorescent lamp 2 are lit by means of a lighting circuit (not shown) and the same portion (lines) of an original MS is illuminated by either blue light BC emitted for the blue fluorescent lamp 1 or red light RC from the red fluorescent lamp 2. The reflected light from the original MS is focused upon an image sensor 4 comprising, for example, a CCD (charge coupled device) line sensor by means of a lens 3, where it is converted into an electric signal (photoelectric conversion signal CE) having a level corresponding to a quantity of the focused light. In this case, for example, calcium tungstate is used as fluorescent substance of the blue fluorescent lamp 1, while, for example, magnesium germanate is employed as a fluorescent substance of the red fluorescent lamp 2. FIG. 2 shows spectral properties of both the blue and red fluorescent lamps 1 and 2.

In this conventional method for reading color image, the blue fluorescent lamp 1 and the red fluorescent lamp 2 are alternately lit, synchronized with the scanning of the original so that readings are made twice for the same line of the original MS each time when the blue and red fluorescent lamps 1 and 2 are lit.

FIGS. 3(a) to 3(d) are timing charts for showing driving modes of this conventional method for reading color image wherein FIG. 3(a) shows the scanning operation of the image sensor 4 as it scans the original MS FIG. 3(b) shows the generating manner of the blue light BC, i.e., the manner of turning on and off the blue fluorescent lamp 1, FIG. 3(c) shows the generating manner of the red light RC, i.e., the manner of turning on and off the red fluorescent lamp 2, and FIG. 3(d) shows photoelectric conversion signals CE outputted from the image sensor 4 in response to the reading and scanning. In FIGS. 3(a) to 3(d), the first line of the original MS consists of blue images (i.e. blue line), whilst the second line consists of red images (i.e. red line).

In the case when the blue light BC is projected during a first scanning period of time (period of time $t_1$ to time $t_2$) on the first line of the original MS as shown in FIG. 3(b), the electric charge corresponding to the reflected light during the above scanning period of time is stored in the image sensor 4, and the charge thus stored is outputted from the image sensor 4 as the photoelectric conversion signal CE during the following scanning period (period of time $t_2$ to time $t_3$) (see FIG. 3(d)). (The maximum amount of reflected light is obtained under this condition and is referred to as "100% reflected light".)

The second scanning is effected with respect to the same first line of the original MS during the period of time $t_2$ to time $t_3$. During this scanning period, the blue light BC is turned off and red light RC is projected in place of the blue light BC as shown in FIGS. 3(b) and 3(c). The red light RC in this case is substantially absorbed by the blue images on the first line of the original MS (see FIG. 2). Accordingly, small amount of light is reflected and therefore the photoelectric conversion signal CE outputted from the image sensor 4 during the following scanning period (period of time $t_3$ to time $t_4$) are small as shown in FIG. 3(d). During scanning periods of time $t_4$ to time $t_5$ and time $t_5$ to time $t_6$, the seond line (red line) is scanned. In this case, photoelectric conversion signal CE resembles the mirror image of the CE signal of the case of scanning the first line (blue line) (see FIG. 3(d)).

In the case when scanning is effected by the image sensor 4 with respect to a white line, substantially 100% reflected light can be obtained for both the blue light BC and the red light RC. In this case, the photoelectric conversion signals CE are of a high level in response to the 100% reflected light. However, in the case when scanning operations are effected with respect to a black line, both the blue light BC and the red light RC are absorbed so that the resulting photoelectric conversion signals CE are of a low level.

In the color discriminating circuit 5 in FIG. 1, level discrimination of the photoelectric conversion signals CE is carried out per picture element, and colors of an image on the original MS are successively discriminated on the basis of a combination of varied cases such as the above cases.

By adopting the above-mentioned conventional method for reading color images, a construction of the optical system becomes simple, and reading precision is elevated. However, there is the disadvantage that the reading speed is restricted due to the limited response speed of the light source in being turned on and off.

For instance, in the example as mentioned above, a fluorescent substance (e.g., magnesium germanate) for emitting red light used in the red fluorescent lamp 2 has generally inferior response characteristics as compared with those of a fluorescent substance (e.g., calcium tungstate) for emitting blue light employed in the blue fluorescent lamp 1. Therefore, the after-glow of the red fluorescent lamp (approx. 2 m sec) lasts longer than that of the blue fluorescent lamp. Accordingly, the red light RC rises slower than the blue light BC as shown in FIG. 3(c). As a result, scanning cannot be accurately effected during after glow periods of time $t_3$ to time $t_4$ and time $t_6$ to $t_7$ (shaded portions in FIG. 3(c)). To solve this problem various countermeasures have been considered heretofore such that the afterglow period is used for feeding the original MS. However, such countermeasures did not relieve the restriction on the original reading rate so that the application of such method as set forth above to high-speed machines has been considered to be impossible.

SUMMARY OF THE INVENTION

Accordingly, an object of the present invention is to provide a method of and an apparatus for reading color image by which disadvantages of the conventional method for reading color by turning on and off a plurality of light sources having different spectral properties can be eliminated, and the reading of originals can be carried out at a higher speed.

The method for reading a color image according to the present invention is one wherein the color image is illuminated while being scanned by light from a plurality of light sources having different spectral properties. The color image is then read on the basis of the reflected light from the color image, comprising steps of continuously turning on at least one light source of said plurality of light sources during the scanning operation and at the same time; turning on and off at least one light source of said light sources other than that kept turned on with a predetermined period corresponding to the period of said scanning operation; illuminating each portion of the color image at least twice by the light from the single or plural light sources selected from among said light sources; and discriminating colors on each portion of said color image on the basis of levels of the reflected light from said color image corresponding to at least two projections of light.

Furthermore, the apparatus for reading color image according to the present invention comprises a plurality of light sources having different spectral properties for scanning said color image; an image sensor for receiving the reflected light from said color image and converting said reflected light into an electrical signal; a first controlling means for continuously turning on at least one light source of said plurality of light sources during the illumination and scanning operation of said color image; a second controlling means for turning on and off at least one light source of said light sources other than that kept turned on with a predetermined period corresponding to the period for converting the reflected light to an electrical signal by means of said image sensor; and discrimination means for discriminating colors on the respective portions of said color image on the basis of a level of the electrical signal outputted from said image sensor.

In this case, the present invention selects a light source having inferior response characteristics, in other words, a light source having a long afterglow period as a light source to be continuously turned on, and a light source having favorable response characteristics, in other words, a light source having a short afterglow period as a light source to be turned on and off. Consequently, the reading speed of originals is not greatly restricted by the response characteristics of the light sources.

Furthermore, the apparatus for reading color image according to the present invention may comprise a plurality of light sources for illuminating an original; an optical color filter disposed between at least one light source of said plurality of light sources and said original for affording predetermined spectral properties to the light which is emitted from that light source, said predetermined spectral properties being different from those of the light emitted from the other light sources; an image sensor placed such that light reflected from said original which is illuminated by said plurality of light sources is focused thereon for reading the color image on said original; controlling means for turning on and off at least one light source of said plurality of light sources with a predetermined period corresponding to the scanning period of said original by means of said image sensor; and discrimination means for discriminating colors of the color image on said original on the basis of a level of the photoelectric conversion signal outputted from said image sensor.

As described above, by giving desired spectral properties to a light source by means of an optical color filter, the slow response speed due to the use of a particular fluorescent substance such as magnesium germanate (red color luminous fluorescent substance) for the light source can favorably be eliminated. Accordingly, the reading speed of an image sensor is not greatly restricted due to the response speed of the light source. In addition, the present invention is not limited to fluorescent lamps having different spectral properties as the plural light sources. Thus, the following various advantages can be obtained:

(1) Color images can be discriminated at high speed.
(2) No particular colored fluorescent lamp is required for the light source.
(3) Color separation of minute shades of color becomes possible by employing optical color filters that distinguish the spectral properties of light corresponding to said minute shades of color.

DESCRIPTION OF THE PREFERRED EMBODIMENTS

Figure 1:
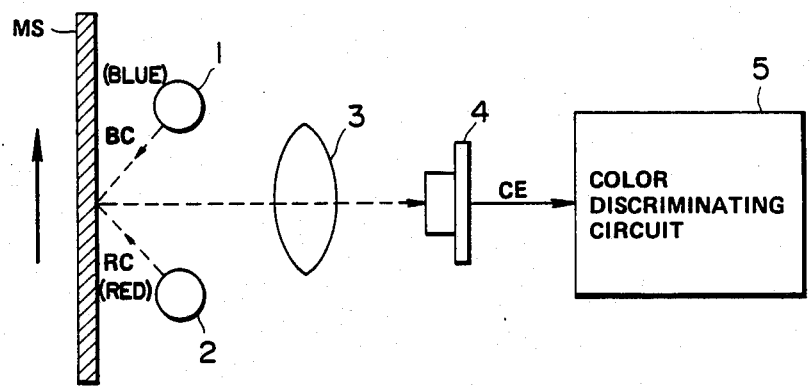
FIG. 1 is a schematic diagram illustrating an example of a conventional apparatus for reading color image.
Figure 2:
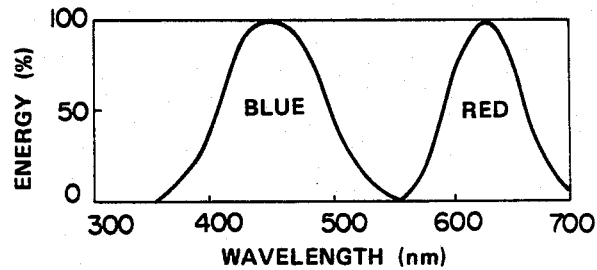
FIG. 2 is a graphical representation showing spectral properties of both blue and red fluorescent lamps.
Figure 3:
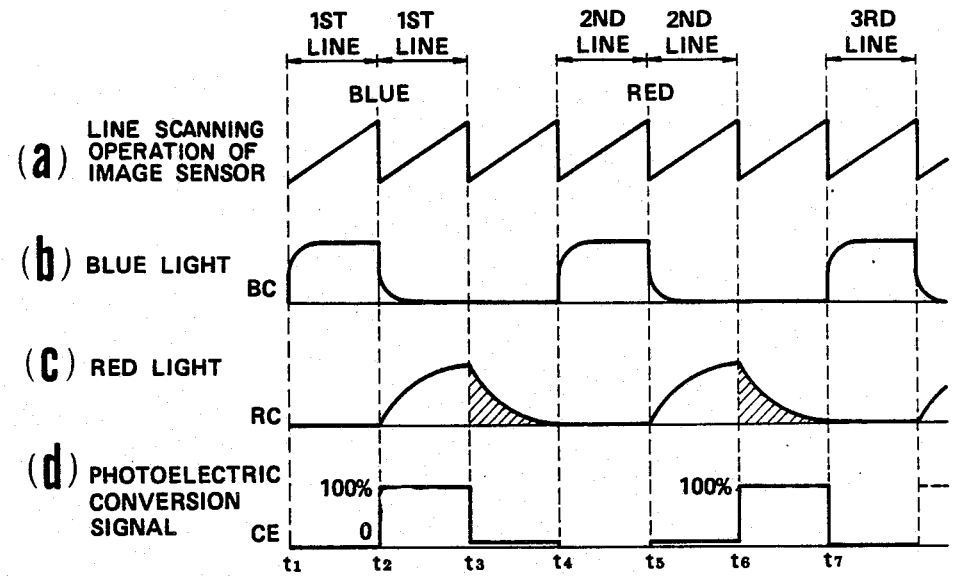
FIGS. 3(a) to 3(d) are timing charts showing operation of a conventional method for reading color image employing the apparatus of FIG. 1.
Figure 4:
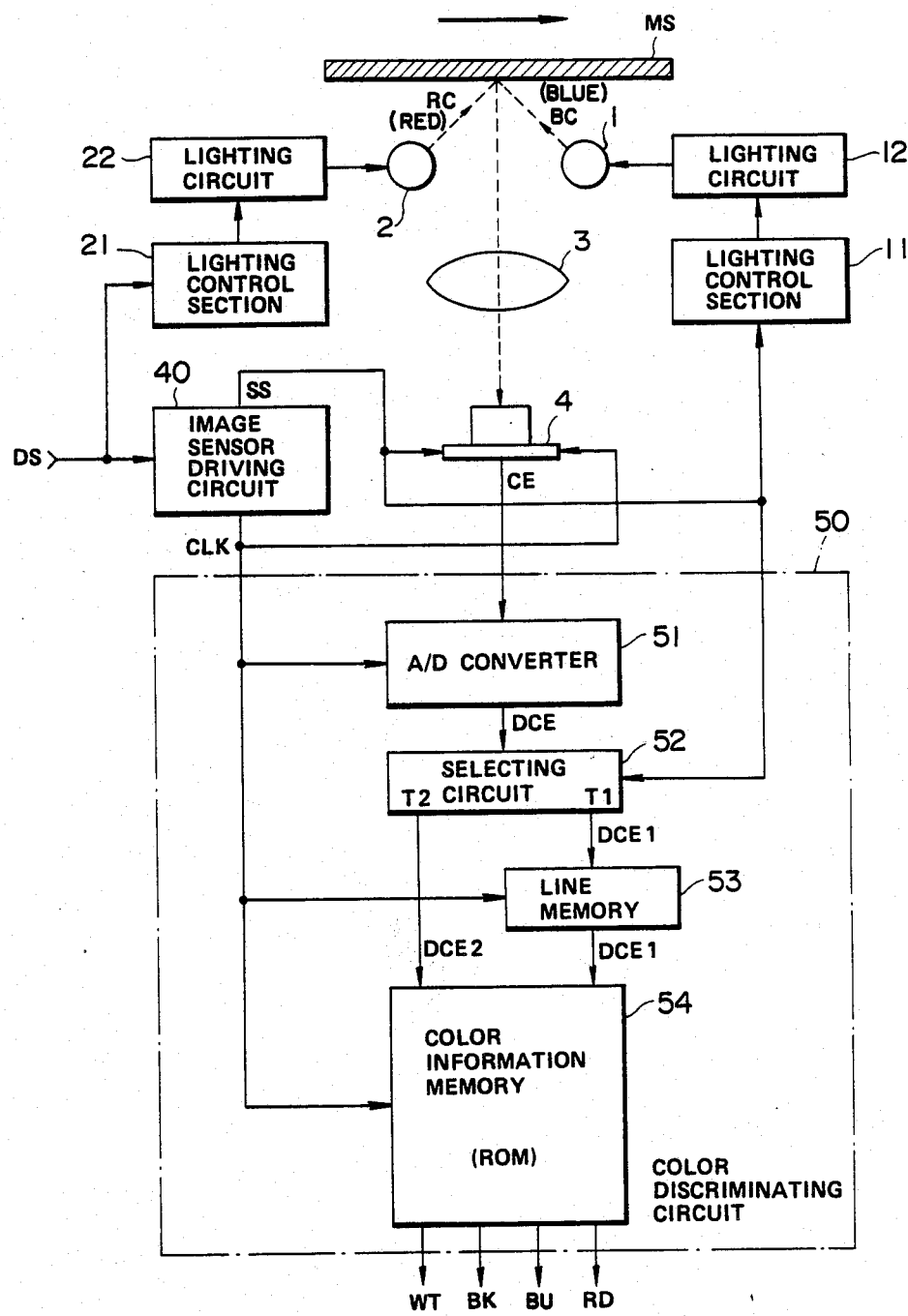
FIG. 4 is a block diagram showing an embodiment of the apparatus for reading color image according to the present invention.

Referring now to FIG. 4 showing an embodiment of the apparatus for reading color image according to the present invention, two fluorescent lamps 1 and 2 of blue and red light are employed as light sources having different spectral properties, and three kinds of color images "blue", "red" and "black" are read as shown in FIG. 1. In FIG. 4, it is assumed that both the blue fluorescent lamp 1 and the red fluorescent lamp 2 are the same as in FIG. 1, with spectral properties as shown in FIG. 2.

When the blue fluorescent lamp 1 is lit by a lighting circuit 12, blue light BC is emitted to illuminate a certain portion (line) of an original MS, and when the red fluorescent lamp 2 is lit by a lighting circuit 22, red light RC is emitted to illuminate the same portion (line) of the original. The reflected light from the original MS is focussed by means of a lens 3 on an image sensor 4 composed of, for example, a CCD line sensor, and is converted by the image sensor 4 into an electrical signal (photoelectric conversion signal (CE) having an electric level corresponding to a quantity of the focussed light. It is to be noted that these operations are the same as those in the apparatus shown in FIG. 1.

In the apparatus shown in FIG. 4, driving of the lighting circuits 12 and 22 is controlled by means of a lighting control units or sections 11 and 21, respectively. The lighting control unit or section 11 controls the driving mode of the lighting circuit 12 such that when the blue fluorescent lamp 1 is turned on and off it synchronizes with the scanning period of an original. The scanning period is initiated in response to a scanning start signal SS outputted form an image sensor driving circuit 40, which instructs the image sensor 4 to start reading and scanning for each line.

The lighting control section 21 controls the driving mode of the lighting circuit 22 such that the red fluorescent lamp 2 remains lit during the full period of reading of the original MS in response to a driving signal DS which remains in an active level during a period from, for example, the operating of the start button to the termination of a full reading of the original MS. The DS signal may also instruct a facsimile that a reading start button (not shown) has been operated and that a reading of the original MS has been completed.

The image sensor driving circuit 40 is a well known circuit which also supplies a picture signal clock CLK, which synchronizes each bit of the picture signal to the image sensor 4 to the driving signal DS, so as to control the operation for reading and scanning the original by the image sensor 4.

In reading the image of the original MS by the apparatus of this embodiment, the original is alternately illuminated by the red light RC and by the mixed light of the red light RC and blue light BC synchronized with the scanning period of the image sensor 4. In the image sensor 4, reading or scanning is executed twice for each line of the original MS while illuminating the original one of the two types of light for each scanning.

FIGS. 5(a) to 5(d) are timing charts for showing operation modes of the apparatus for reading color image and the reading operations of color image in the embodiment will be described by referring to these timing charts. FIG. 5(a) shows the scanning operation of the image sensor 4 as it scans the original MS, FIG. 5(b) shows a generating manner of the blue light BC, FIG. 5(c) shows a generating manner of the red light RC, and FIG. 5(d) shows the photoelectric conversion signals CE outputted from the image sensor 4 in response to the scanning. It is assumed here that the first line of the original MS consists of white images (white line), the second line black images (black line), the third line blue images (blue line), and the fourth line red images (red line).

When the mixed light of the blue light BC and the red light RC (which is actually light blue light, but it may be considered to be approximately white light) is projected during a first scanning period of time (period of time $t_1$ to time $t_2$) onto the first line of the original MS the charge corresponding to the reflected light (100% reflected light) during the scanning period of time is stored in the image sensor 4, and the charge thus stored is outputted from the image sensor 4 as the photoelectric conversion signal CE during the following scanning period (period of time $t_2$ to time $t_3$) (see FIG. 5(d)). As shown in FIGS. 5(b) and 5(c), the blue light BC disappears and only the red light RC is projected during the scanning period of time $t_2$ to time $t_3$, i.e., a second scanning period with respect to the first line. However, since the first line is white, the charge corresponding to 100% reflected light is stored in the image sensor 4 during this scanning period, and then the stored charge is outputted from the image sensor 4 as the photoelectric conversion signal CE during the following scanning period of time (period of time $t_3$ to time $t_4$) (see FIG. 5(d)). That is, the case of the white scanning line, the photoelectric conversion signal CE is of a high level corresponding to 100% reflected light over two scanning periods. With respect to the scanning periods during the second line (periods of time from $t_3$ to $t_4$ and from $t_4$ to $t_5$), since the second line is black, even if the light is either the mixed light or the red light RC, both of the lights are absorbed. The photoelectric conversion signal CE in this case becomes of a low level over two scanning periods.

During the first scanning period with respect to the third line (blue line) (period of time $t_5$ to time $t_6$) the mixed light is projected. In this case, reflected light is around 50% of the incident light, that is, a half of the 100% reflected light (hereinafter referred to as 50% reflected light) is reflected from the blue picture image, and the charge corresponding to this quantity of light is stored in the image sensor 4. The charge thus stored is outputted from the image sensor 4 as the photoelectric conversion signal CE having an intermediate level during the following scanning period (period of time $t_6$ for time $t_7$) (see FIG. 5(d)). During the scanning period of time $t_6$ to time $t_7$, i.e., a second scanning period of time with respect to the third line, only the red light RC is projected. Since the third line is blue, most of the incident light is absorbed (see FIG. 2), and the photoelectric conversion signal CE in this case is of a low level. Namely, in the case when a blue line is scanned and when light is projected in the order of mixed light of the blue light BC and the red light RC followed by the red light RC, the photoelectric conversion signal CE has an intermediate level corresponding to 50% reflected light during the first scanning period, whilst the signal CE has a low level during the second scanning period. Then, when the mixed light is projected during a first scanning period of time (period of time $t_7$ to time $t_8$) with respect to the fourth line of said original MS which is red, 50% reflected light is obtained from the red picture image as in the case of the first scanning period of time with respect to said third line (period of time $t_5$ to time $t_6$). Thus, the charge corresponding to this quantity of light is stored in the image sensor 4. The charge thus stored is also outputted from the image sensor 4 as the photoelectric conversion signal CE having an intermediate level during the following scanning period of time (period of time $t_8$ to time $t_9$). During the scanning period of time $t_8$ to time $t_9$, i.e., the second scanning period of time with respect to the fourth line of said original MS, only the red light RC is projected. In this case, 100% reflected light is obtained so that the photoelectric conversion signal CE having a high level corresponding to this 100% reflected light is outputted from the image sensor 4 during the following scanning period of time (period of time $t_9$ to time $t_{10}$). That is, in the case when the red line is scanned and when light is projected in the order of mixed light of the blue light BC and the red light RC followed by the red light RC, the photoelectric conversion signal CE has an intermediate level corresponding to 50% reflected light during the period corresponding to the first scanning period of time, whilst the signal CE has a high level corresponding to 100% reflected light during the period corresponding to the second scanning period of time as shown in FIG. 5(d).

As described above, the photoelectric conversion signal CE obtained in accordance with the embodiment of FIG. 4 assume specific levels in response to colors of the image in the original.

Figure 6:
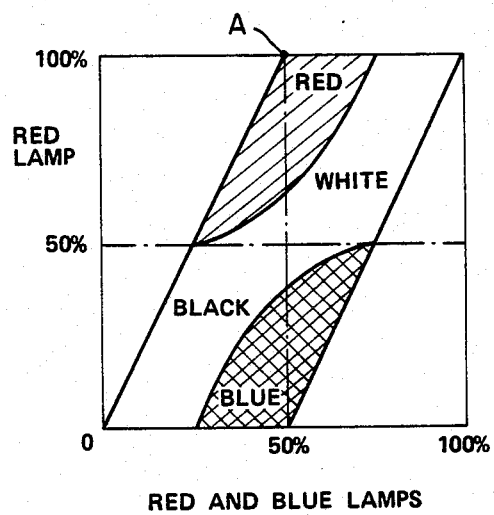
FIGS. 6 and 7 are color distribution diagrams obtained by the embodiment shown in FIGS. 4 and 5, respectively.

A graphical representation of a relationship between the levels of the photoelectric conversion signal CE and the colors of the image provides a color distribution diagram as shown in FIG. 6.

In FIG. 6, a percent level of the photoelectric conversion signal CE when the mixed light of the blue light BC and the red light RC is projected is plotted along abscissa, while a percent level of the photoelectric conversion signal CE when the red light RC is projected is plotted along the ordinate. In this drawing, a region defined by the intersection of these two levels indicates the colors of the image. For color, if the percent level of the photoelectric conversion signal CE when the mixed light is projected (abscissa) is 50%, whilst the percent level of the photoelectric conversion signal CE when the red light RC is projected (ordinate) is 100% (i.e., point A in FIG. 6), the color of the image is completely red. This coincides with the result obtained during the period of time $t_3$ to time $t_{10}$ in FIG. 5(d). This means that if only both of the percent levels of the photoelectric conversion signal CE for the mixed light and the red light RC are known, the colors of the image ("blue", "red", and "black" in this case) can be distinctly discriminated.

An example of an electrical processing method will be described hereinbelow by referring again to FIG. 4.

The photoelectric conversion signal CE outputted from the image sensor 4 is inputted to an A/D (analog-to-digital) converter 51. The A/D converter 51 is a well known circuit which judges a level of input analog signal in synchronization with the picture signal clock CLK provided from the image sensor driving circuit. The A/D converter 51 generates a digital signal indicating a value corresponding to the analog level of the input analog signal, and successively converts the photoelectric conversion signal CE into a digital signal indicating a value corresponding to the aforementioned percent level hereinafter referred to as coded photoelectric conversion signal DCE").

The coded photoelectric conversion signal DCE is fed to a switching or selecting circuit 52. The switching circuit 52 distributes input signals in synchronization with the scanning period of the original by the image sensor 4 in response to the scanning start signal SS outputted from the image sensor driving circuit 40. In this case, it is assumed that among the coded photoelectric conversion signals DCE, the one generated in response to the first scanning period (hereinafter referred to as first coded photoelectric conversion signal DCE 1) is distributed to the output terminal $T_1$ of the switching or selecting circuit 52 and applied to a line memory 53, whilst the one generated in response to the second scanning period (hereinafter referred to as second coded photoelectric conversion signal DCE 2) is distributed to the output terminal $T_2$ of the switching or selecting circuit 52 and applied directly to a color information memory 54 composed of ROM (read-only memory). In the above case, the line memory 53 has a capacity corresponding to the number of picture elements per one scanning line. The first coded photoelectric conversion signal DCE 1 applied to the line memory 53 is successively shifted in response to each signal corresponding to each picture element and is applied to the color information memory 54 after being delayed by one scanning period.

Thus, the first and second coded photoelectric conversion signals DCE 1 and DCE 2, derived from the same line of the original MS, are concurrently applied to the color information memory 54 for each signal corresponding to the same picture element.

The color information memory 54 is for previously storing a coded white information WT indicating white color, a coded black information BK indicating black color, a coded blue information BU indicating blue color, and a coded red information RD indicating red color. These codes are based on, for example, a color distribution in FIG. 6, and operates such that a pertinent coded color information among the coded color informations WT, BK, BU and RD is sequentially read by utilizing the first and second coded photoelectric conversion signals DCE 1 and DCE 2 as address signals. For example, the coded red information RD indicating red color has previously been stored in the address specified by an address signal in the color information memory 54 corresponding to the point A in FIG. 6, i.e., a value represented by the first coded photoelectric conversion signal DCE 1 is "50" and a value represented by the second coded photoelectric conversion signal DCE 2 is "100". This coded red information RD is read from the memory 54 when the pertinent applied signal of the first coded photoelectric conversion signal DCE 1 indicates the value "50" and the pertinent applied signal of the second coded photoelectric conversion signal DCE 2 indicates the value "100". If the apparatus is, for example, a facsimile equipment, the coded color information thus read is transferred to a transmitting equipment and reproduced by a color printer on the side of a receiver.

Figure 5:
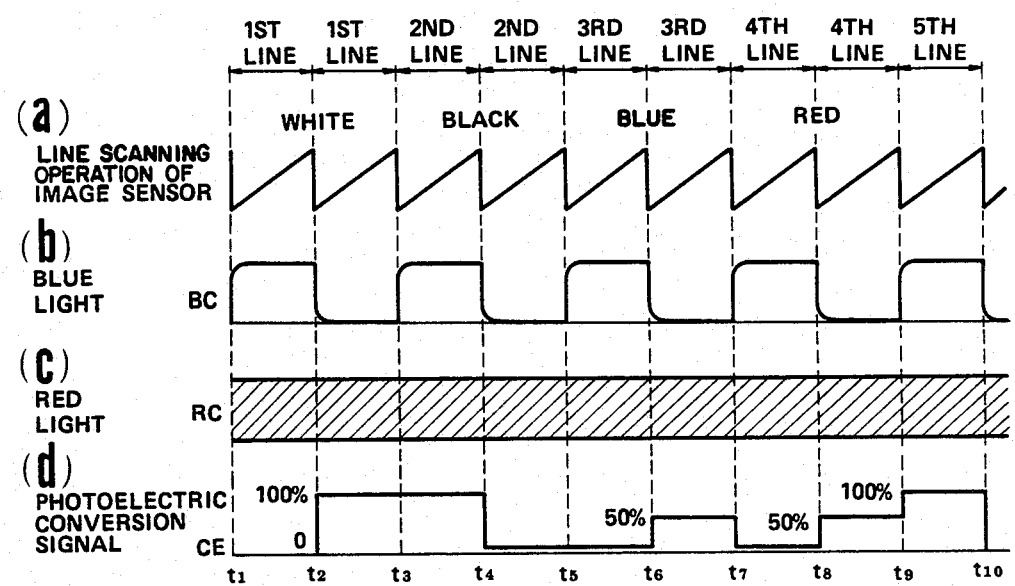
FIGS. 5(a) to 5(d) are timing charts each showing operation of an example of the method for reading color image according to the present invention wherein the apparatus of the embodiment in FIG. 4 is employed.

It is to be noted that the foregoing explanation of FIG. 5 is made in the case wherein images of the lines of the original MS are either white, black, blue or red for easy understanding. In reality, however, reading and image processing are effected for each picture element in response to the picture signal clock CLK. In addition, the photoelectric conversion signal CE shown in FIG. 5(d) takes complicatedly varied shapes in response to differences in colors of picture elements.

The present invention is not limited to the above arrangement where the photoelectric conversion signal CE outputted from the image sensor 4 is directly applied to the A/D converter 51 to produce the coded photoelectric conversion signal DCE corresponding to the percent level in the color discriminating circuit 50 (FIG. 4). Another arrangement may also be adopted where prior to applying the photoelectric conversion signal CE to the A/D converter 51, the photoelectric conversion signal CE produced when the red light is projected with respect to the same line is electrically subtracted from the photoelectric conversion signal CE produced when the mixed light of the blue light BC and the red light RC is projected. The resulting subtracted signal is then applied to the A/D converting circuit 51 to produce the coded photoelectric conversion signal DCE.

Figure 7:
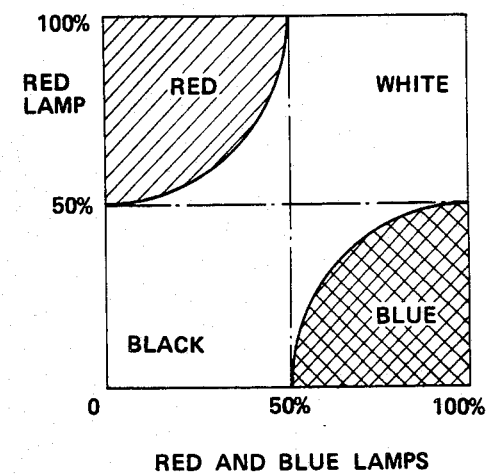

FIG. 7 is a color distribution diagram graphically representing the relationship between the form of the subtracted signal and colors of the image. As seen form FIG. 7, requirements of precision when a level of the photoelectric conversion signal CE is judged in the A/D converter 51 are substantially relaxed, and therefore the present invention can be more easily realized.

In the aforementioned embodiment, although the method and apparatus have been described in the case where three kinds of color images of "blue", "red" and "black" (in the case, "white" is blank and is not included in the image) are read by using two fluorescent lamps of the blue fluorescent lamp 1 and the red fluorescent lamp 2, there is no limitation as to either the selection of color of these light sources or the selection of color of picture images to be read, so that any arbitrary selection can be effected in accordance with their actual circumstances. Colors considered to be usually employed other than those described above include "green", "cyan", "magenta" and "yellow". Of course, a so-called multicolor reading can also be effected, if three light sources are obtained by adding a green light source to the blue and red light sources already employed. In this case, the image sensor scans the same portion of an original three times with the light being projected by a "red light source plus blue light source", "red light source plus green light source" and "red light source only", in a manner synchronous with the above scanning periods. These light sources should be arranged in such a way that at least one light source having inferior response characteristics, i.e., a long afterglow period, among a plurality of light sources of different spectral properties is kept lighting. Furthermore, light may be projected in any order so far as their periods are kept constant. For instance, in the case of the above embodiment, the red light RC may be projected when the first scanning is effected, and the mixed light of the blue light BC and the red light RC may be projected in the second scanning.

Further, although a CCD line sensor is used as the image sensor 4 in the aforesaid embodiment, any sensor may be used so far as it is a photoelectric conversion device which can be employed in an original reading apparatus.

Figure 8:
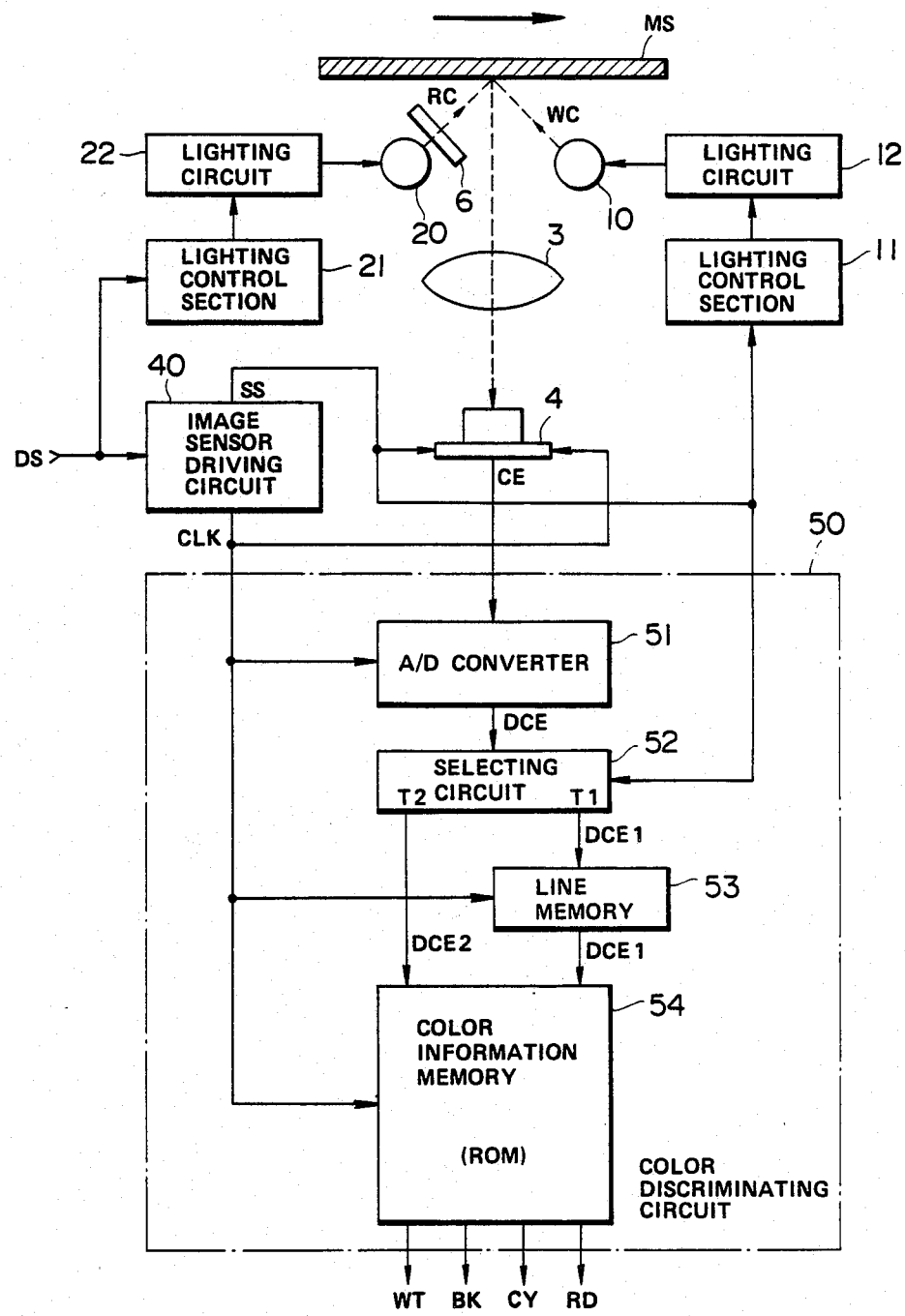
FIG. 8 is a block diagram showing another embodiment of the apparatus for reading color image according to the present invention.

FIG. 8 illustrates another embodiment of the apparatus for reading color image according to the present invention wherein two natural white fluorescent lamps are used as the light sources, and one of the fluorescent lamps is provided wth an optical color filter of red transmission type (colored glass filter), whereby three kinds of color images, i.e., those of "red color", "black color" and "the third color" (cyan, complementary color of red, is assumed in this case) are to be read.

In FIG. 8, parts having the same function as the corresponding parts in the embodiment of FIG. 4 are denoted by the same reference numerals corresponding to FIG. 4. In FIG. 8, reference numerals 10 and 20 designate white fluorescent lamps (hereinafter referred to as fluorescent lamp), and 6 designates the color filter of red transmission type. When the fluorescent lamp 10 is lit by driving a lighting circuit 12, natural white light WC is projected upon an original MS, and when the fluorescent lamp 20 is lit by driving a lighting circuit 22, red light RC is projected on the original MS. The other construction of the present embodiment is the same as that illustrated in FIG. 4.

Employing the apparatus as mentioned above, the light from the red light RC and the mixed light from the combined red light RC and the natural white light WC, are alternately projected onto the image surface of the original MS in a manner synchronous with the scanning period of the image sensor 4.

Figure 9:
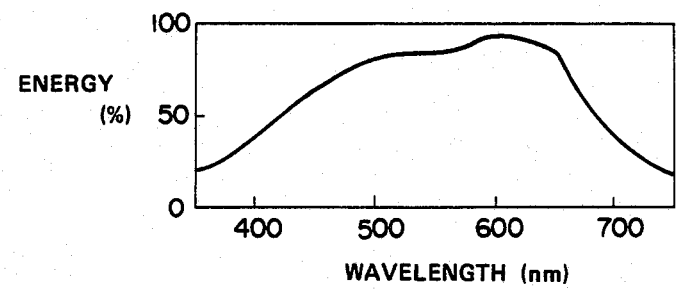
FIGS. 9(a) to 9(c) are graphical representations each showing spectral properties of the light illuminating an original in the apparatus of the embodiment illustrated in FIG. 8.
Figure 9:
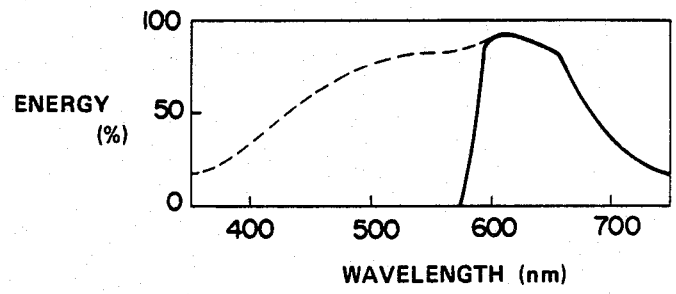
Figure 9:
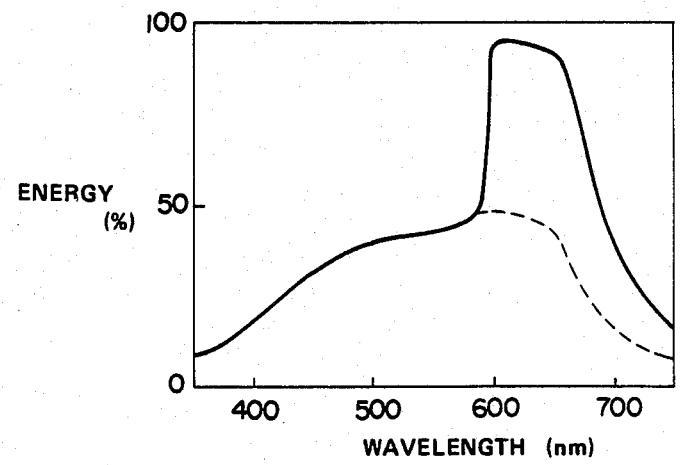

FIGS. 9(a) to 9(c) show a spectral distribution of the projection of light. More specifically, FIG. 9(a) is a graphic representation showing spectral distribution of a natural white fluorescent lamp wherein the light, i.e., the natural white light WC contains approximately 30% of red component having a wavelength of 600 nm or more. FIG. 9(b) shows a spectral distribution wherein the natural white fluorescent lamp is provided with the color filter 6 of red transmission type. In this case, the light, i.e., the red light RC is nearly 100% of the red component. FIG. 9(c) shows a spectral distribution wherein the natural white light WC is combined with the red light RC, and the resulting combined light contains approximately 50% of the red component.

In the image sensor 4, reading operations are executed twice for each line of the original MS by two kinds of light projection, that is, the red light RC and the mixed light.

FIGS. 10(a) to 10(d) are timing charts showing the operation of the present embodiment. The reading operations of the color images in the present embodiment will be described by referring to these timing charts.

Figure 10:
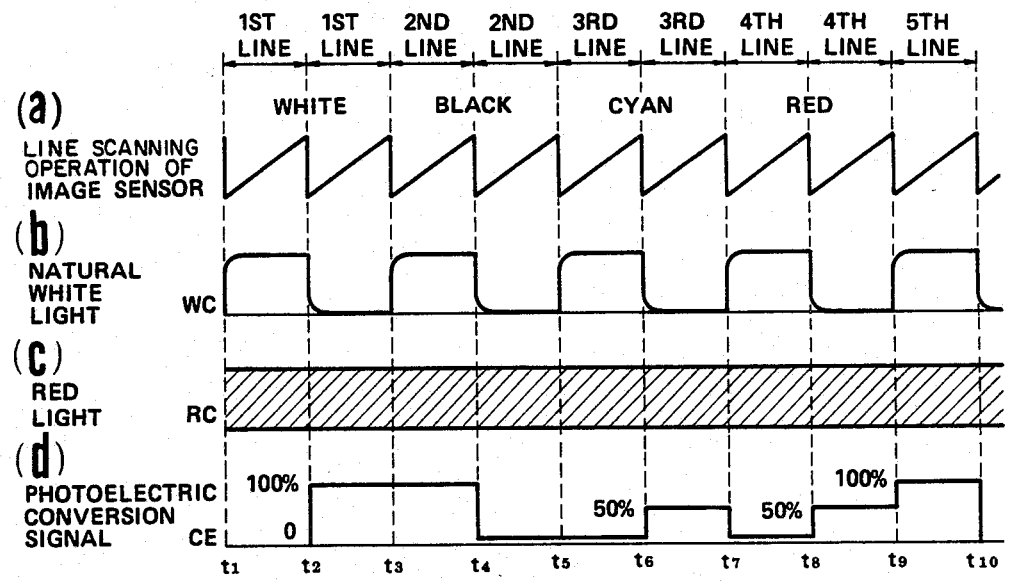
FIGS. 10(a) to 10(d) are timing charts showing an example of the operation for reading the color image in the apparatus of the embodiment in FIG. 8.

FIG. 10(a) shows the scanning operation of the image sensor 4 as it scans the original MS, FIG. 10(b) shows generation of the natural white light WC, FIG. 10(c) shows generation of the red light RC, and FIG. 10(d) shows photoelectric conversion signals CE outputted from the image sensor 4 in response to the above scanning. In this case, the first line of the original MS consists of white images (white line), the second line consists of black images (black line), the third line consists of cyan images (cyan line), and the fourth line consists of red images (red line).

If the mixed light consisting of the natural white light WC and the red light RC is projected during a first scanning period with respect to the first line of the original MS (time $t_1$ to time $t_2$) as shown in FIGS. 10(b) and 10(c), the electric charge corresponding to the reflected light (100% a reflected light) is stored in the image sensor 4 during this scanning period of time. The charge thus stored is outputted from the image sensor 4 as the photoelectric conversion signal CE during the following scanning period (time $t_2$ to time $t_3$) (see FIG. 10(d)). The natural white light WC disappears and only the red light RC is projected during the second scanning period with respect to the first line (time $t_2$ to time $t_3$) as shown in FIGS. 10(b) and 10(c). However, since the first line is white, the charge corresponding to 100% reflected light is stored in the image sensor 4 during this scanning period, and then the stored charge is outputted from the image sensor 4 as the photoelectric conversion signal CE during the following scanning period (time $t_3$ to time t4) (see FIG. 10(d)). That is, in the case where the scanning line is white, the photoelectric conversion signal CE becomes a high level corresponding to 100% reflected light over two scanning periods. With respect to scanning periods of the second line (time $t_3$ to time $t_4$ and time $t_4$ to time $t_5$), since the second line is black the light is absorbed even if the light projected upon the color image is either the mixed light or the red light RC. Consequently, the photoelectric conversion signal CE in this case becomes a low level over two scanning periods in contrast to the case of reading the first line. During a first scanning period with respect to the third line which is cyan (time $t_5$ to time $t_6$), the mixed light is projected. In this case, reflected light of approximately 50%, that is, about half of the aforesaid 100% reflected light (hereinafter referred to as 50% reflected light) is produced from the cyan image, and the charge corresponding to this quantity of light is stored in the image sensor 4. The charge thus stored is outputted from the image sensor 4 as photoelectric conversion signal CE having an intermediate level during the following scanning period (time $t_6$ to time $t_7$) (see FIG. 10(d)). Furthermore, the red light RC is projected during the scanning period of time $t_6$ to time $t_7$, i.e., a second scanning period of time with respect to the third line of the original MS. Since the third line is cyan, the light projected is mostly absorbed, and the photoelectric conversion signal CE in this case becomes a low level. In the case where the line to be scanned is cyan, when mixed light consisting of the natural white light WC and the red light RC, followed by the red light RC is projected, the photoelectric conversion signal CE has an intermediate level corresponding to 50% reflected light during a period corresponding to the first scanning period as shown in FIG. 10(d), and has a low level during a period corresponding to the second scanning period. When the mixed light is projected during a first scanning period of time with respect to the fourth line of said original MS which is red (time $t_7$ to time $t_8$), 50% reflected light being about half of the 100% reflected light is produced from the red image (see FIG. 10(c)). The charge corresponding to this quantity of light is stored in the image sensor 4. The charge thus stored in outputted from the image sensor 4 as the photoelectric conversion signal CE having an intermediate level during the following scanning period (time $t_8$ to time $t_9$). Furthermore only the red light RC is projected during the scanning period of time $t_8$ to time $t_9$, i.e., a second scanning period with respect to the fourth line of the original MS. In this case, 100% reflected light is produced so that the photoelectric conversion signal CE having a high level corresponding to this 100% reflected light is outputted from the image sensor 4 during the following scanning period (time $t_9$ to time $t_{10}$). That is, in the case where the line to be scanned is red, when mixed light consisting of the natural white light WC and the red light RC followed by the red light RC is projected, the photoelectric conversion signal CE has an intermediate level corresponding to 50% reflected light during a period corresponding to the first scanning period, and has a high level corresponding to 100% reflected light during a period corresponding to the second scanning period as shown in FIG. 10(d).

As described above, the photoelectric conversion signal CE produced in the embodiment of FIG. 8 assumes the levels of the respective specific characteristics in response to colors of the image to be read.

Figure 11:
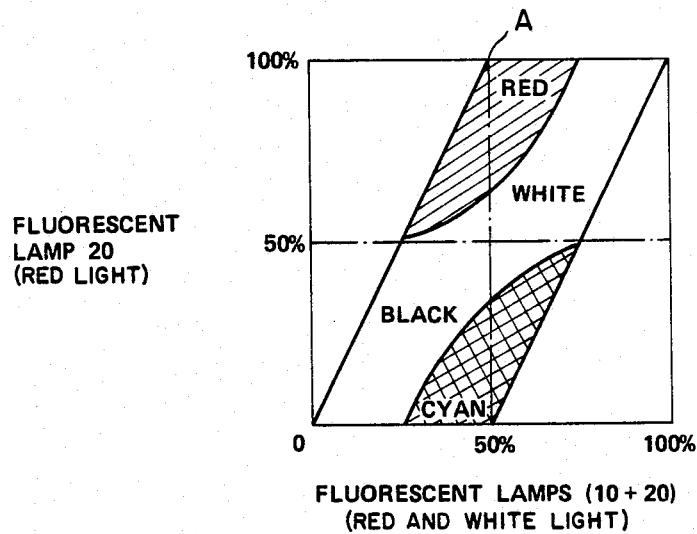
FIG. 11 is a color distribution diagram obtained by the apparatus of the embodiment in FIG. 8.

A graphical representation of a relationship between the levels of the photoelectric conversion signal CE and the colors of the image in the image to be read provides a color distribution diagram as shown in FIG. 11.

In FIG. 11, percent level of the photoelectric conversion signal CE is plotted on the abscissa when the mixed light consisting of the natural white light WC and the red light RC is projected, while percent level of the photoelectric conversion signal CE is plotted on the ordinate when only the red light RC is projected. A region defined by the intersection of these two percent levels indicates the color of the image. For example, assume that the percent level (abscissa) of the photoelectric conversion signal CE when the above "mixed light" is projected is 50%, and the percent level (ordinate) of the photoelectric conversion signal CE is 100% (i.e., the event corresponding to point A in FIG. 11), then the color of the image is absolutely red. This result coincides with the result during the period of time $t_3$ to time $t_{10}$ in FIG. 10(d). This means that if only both of the percent levels of the photoelectric conversion signal CE when "mixed light" is projected and when "only the red light RC" is projected are known, all colors of the image ("red", "black", and "cyan" in this case) are distinctly discriminated.

The method for electrically processing the above procedure is the same in the embodiment illustrated in FIG. 4, where the coded blue information BU indicating "blue color" is replaced by a coded cyan information CY indicating "cyan color" in the embodiment For this reason, further explanation will be omitted.

In the aforementioned embodiment, the fluorescent lamp 20, provided with the color filter 6 of red transmission type, is kept turned on while the other fluorescent lamp 10 is turned on and off.

This arrangement is not limiting. For example, the fluorescent lamp 10 may remain turned on while fluorescent lamp 20, provided with the color filter 6, may be turned on and off. Alternatively, these two fluorescent lamps 10 and 20 may be alternately turned on. This flexibility is permitted by the optical color filter, employed to establish spectral properties of the light source in the present embodiment, which has no problem of afterglow. As a result, reading or scanning rate of original by means of the image sensor 4 is not restricted by any selection of a fluorescent lamp to be turned on and off. As a matter of course, as modes for lighting the fluorescent lamps 10 and 20 are changed as mentioned above, level of the photoelectric conversion signal CE shown in FIG. 10(d) as well as the color distribution shown in FIG. 11 will also change. However, since the photoelectric conversion signal CE varies predictably for each color, color discrimination can effectively be carried out based on the combination of the electrical levels of the photoelectric conversion signal. Namely, in the color discriminating circuit 50 shown in FIG. 8, it is sufficient that a position for storing each color information in said color information memory 54 be changed so as to correspond to a color distributions constructed on the basis of the predicted levels of the photoelectric conversion signal CE.

In the above embodiment, three kinds of color of red, black and cyan (in practice, white is considered blank and is not included) are discriminated by employing two natural fluorescent lamps as the light sources, one of which is provided wth a color filter of red transmission type. However, there is no limitation as to the number of light sources, the number of color filters, selection of the transmission color of the color filter, and the selection of image colors to be read (discriminated), so that any arbitrary selection can be effected in accordance with their actual use. Particularly, in the case where the aforementioned three kinds of color images are to be read, if the light source other than that provided with the color filter of red transmission type is provided with a color filter of cyan transmission type, discrimination of the color images will be more clearly effected. Fundamentally speaking, the image colors are discriminated on the basis of the selection of color filters. Accordingly, when color filters having minute differences of light wavelength transmitting properties are suitably selected in the apparatus for reading color images according to the present embodiment, the color images can be separated and discriminated effectively, even though they have minute differences of colors. Incidentally, colors usually appear in an image of an original other than those described above, including green, blue, magenta and yellow.

Of course, a so-called multi-color reading (discrimination) can also be effected by employing three light sources, a light source provided with a color filter of blue transmission type and a light source provided with a color filter of green transmission type in addition to the light source provided with the aforementioned color filter of red transmission type. In this case, it may be arranged such that the image sensor scans the same portion of an original three times, and at least two among the three light sources are turned on and off in a manner synchronous with the above scanning periods. These light sources may be turned on or off in any order so far as their periods are kept constant. For instance, in the case of the aforementioned embodiment, only the fluorescent lamp 20 is lit to project "only the red light RC" when the first reading or scanning is effected with respect to the same line of the image sensor 4, and the projection of light may be followed by lighting both the fluorescent lamps 10 and 20, or only the fluorescent lamp 10 to utilize either the "mixed light consisting of the red light RC and the natural white light WC" or "only the natural white light WC", in the case of the second reading or scanning.

In addition, although a CCD line sensor has been used as the image sensor 4 in the aforesaid embodiments, any sensor may be employed so far as it can be employed in an apparatus for reading originals.

In the case where a principal object of such an apparatus for reading color image is directed to only high speed reading of the color images, the use of a blue or green fluorescent lamp haivng comparatively favorable response characteristics as the light source does not depart from the spirit of the present invention. An optical color filter is utilized when a color fluorescent lamp having inferior response characteristics such as a red fluorescent lamp is to be employed.

What is claimed is:

1. A method for reading a color image wherein said color image is illuminated by light from a plurality of independent light sources having different spectral properties, and is scanned one portion at a time by an image sensor to read said color image on the basis of reflected light therefrom, comprising the steps of:
   turning on at least one of said light sources continuously during the scanning operation of the color image;
   repeatedly turning on and off at least another one of said light sources with a period corresponding to the period of said scanning operation of said portion;
   projecting the light from both said continuous and intermittent light sources onto the scanned portions of said color image; and
   reading said color image by discriminating colors of the scanned portions of said color image on the basis of levels of said continuous and intermittent light reflected by said color image and detected by said image sensor.

2. A method for reading a color image as claimed in claim 1 wherein said continuous light source has on-off response characteristics inferior to those of said light source which is repeatedly turned on and off.

3. A method for reading a color image as claimed in claim 1 wherein said plurality of light sources consists of a first light source of a red fluorescent lamp in which magnesium germanate is used as the fluorescent substance and a second light source of a blue fluorescent lamp in which calcium tungstate is used as the fluorescent substance, said first light source being kept continuously turned on, while said second light source is repeatedly turned on and off.

4. A method for reading a color image as claimed in claim 1 wherein said plurality of light sources comprises at least two lamp selected from white, red, green, blue, cyan, magenta, and yellow fluorescent lamps.

5. An apparatus for reading a color image comprising:
   a plurality of light sources having different spectral properties from one another for illuminating said color image;
   an image sensor for scanning and receiving reflected light from one portion of said illuminated color image at a time, said reflected light being converted into an electrical signal;
   first controlling means for keeping continuously turned on at least one light source;
   second controlling means for repeatedly turning on and off at least one other light source with a period corresponding to the period of scanning of said portion of said color image by said image sensor; and
   means for discriminating colors on the scanned portions of said color image on the basis of levels of said electrical signals outputted from said image sensor.

6. An apparatus for reading a color image as claimed in claim 5 wherein said image sensor is a charge-storage type photoelectric conversion element.

* * * * *